May 4, 1943. R. P. CARLTON 2,318,570
MANUFACTURE OF ABRASIVES
Filed Jan. 20, 1930 5 Sheets-Sheet 1
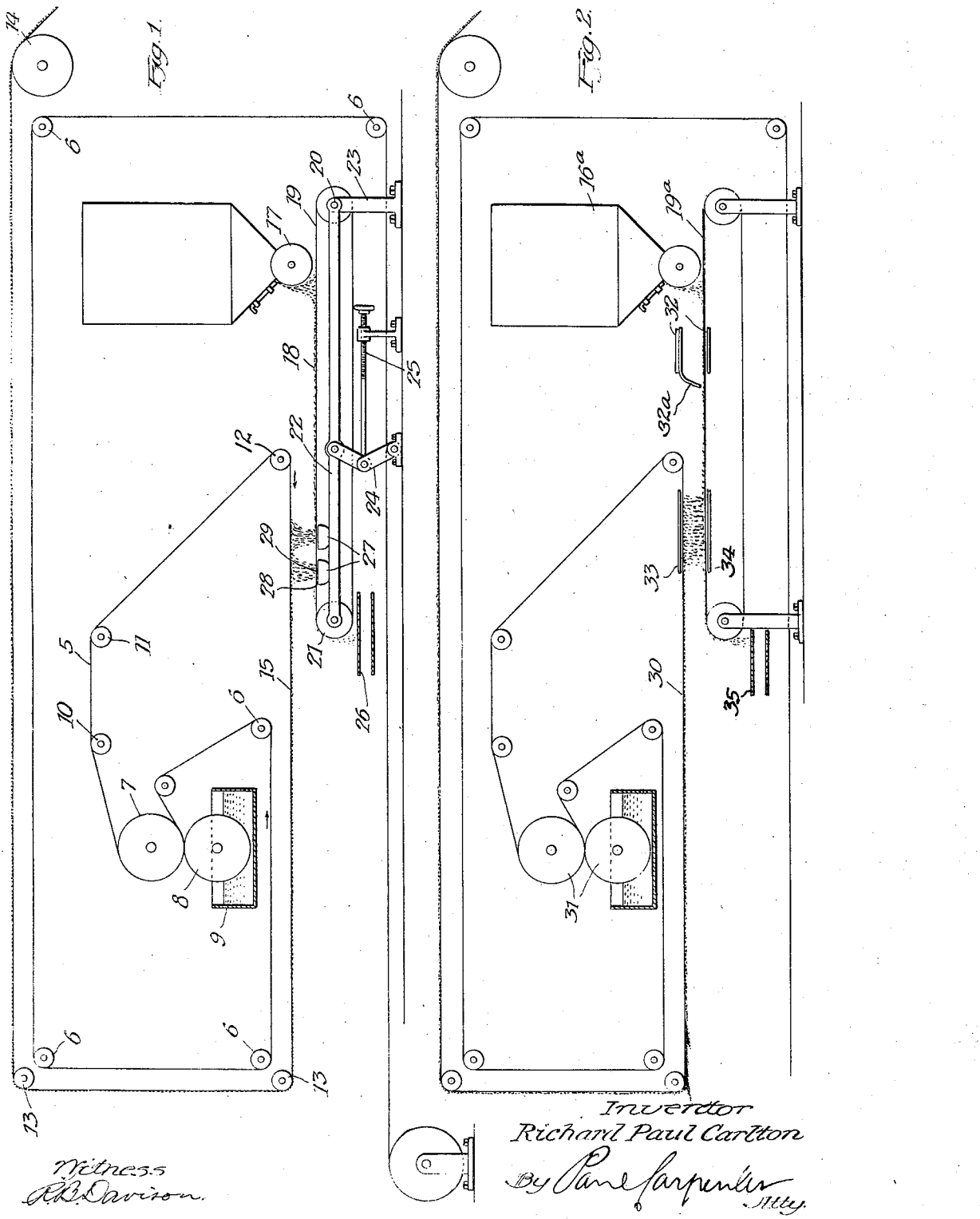

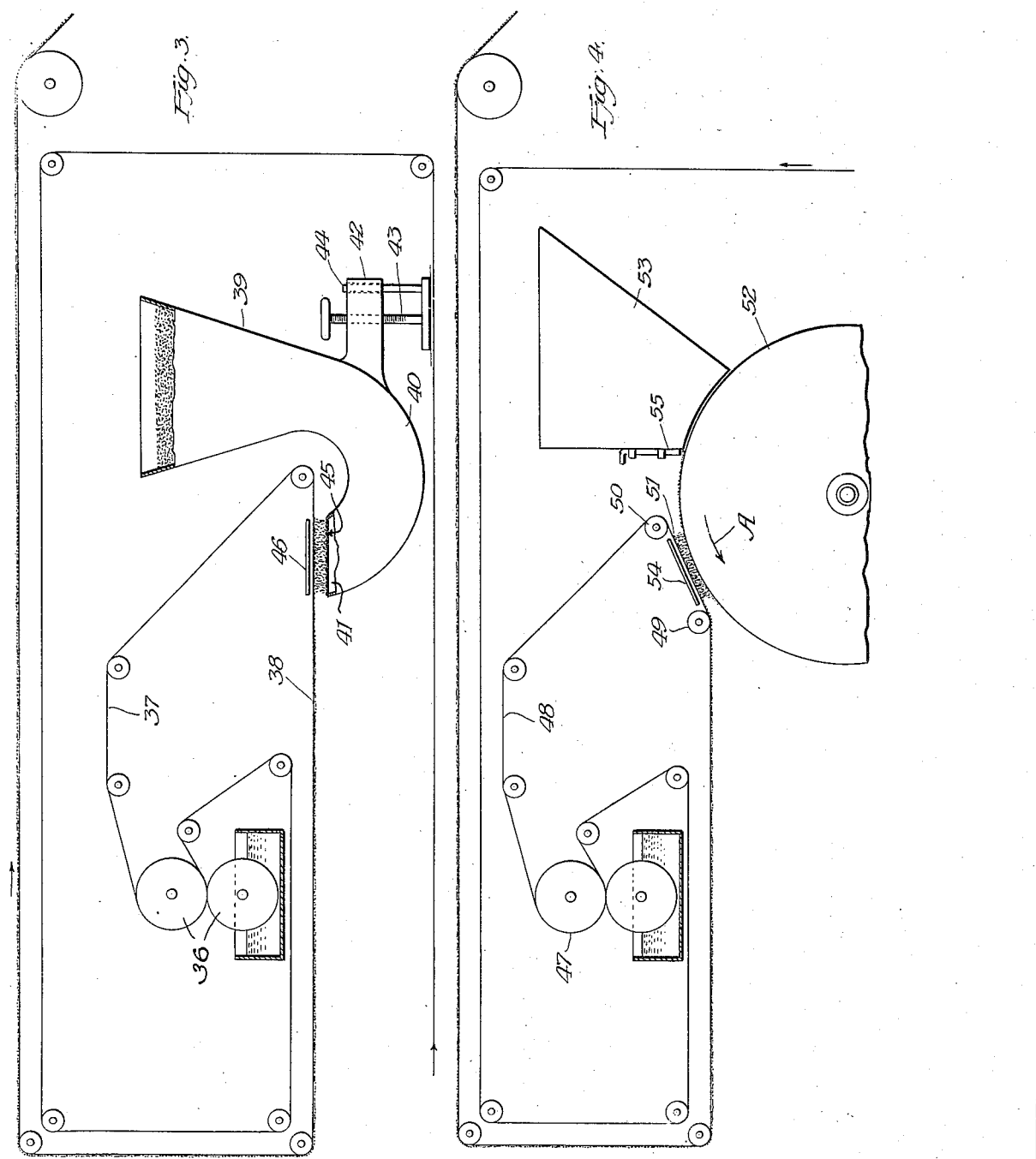

May 4, 1943.  R. P. CARLTON  2,318,570
MANUFACTURE OF ABRASIVES
Filed Jan. 20, 1930   5 Sheets-Sheet 3
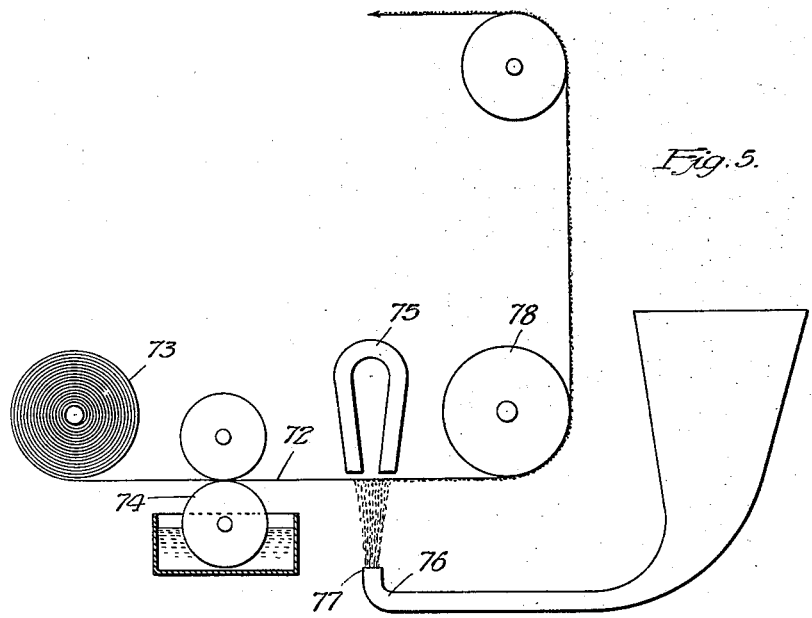
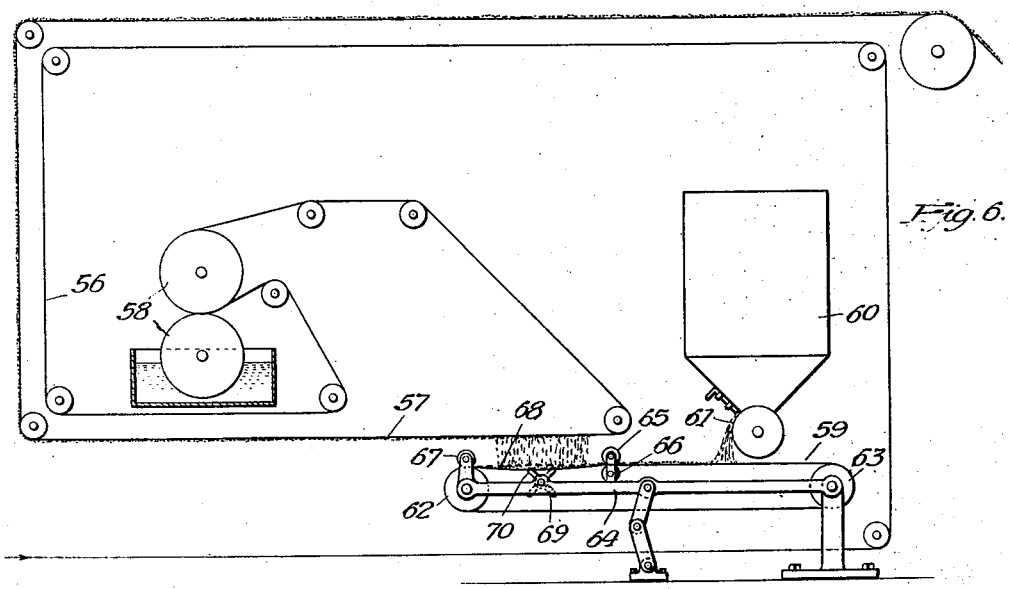
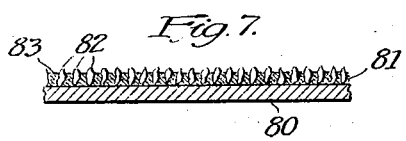
Inventor
Richard Paul Carlton
Witness May 4, 1943.　　　R. P. CARLTON　　　2,318,570
MANUFACTURE OF ABRASIVES
Filed Jan. 20, 1930　　　5 Sheets-Sheet 4
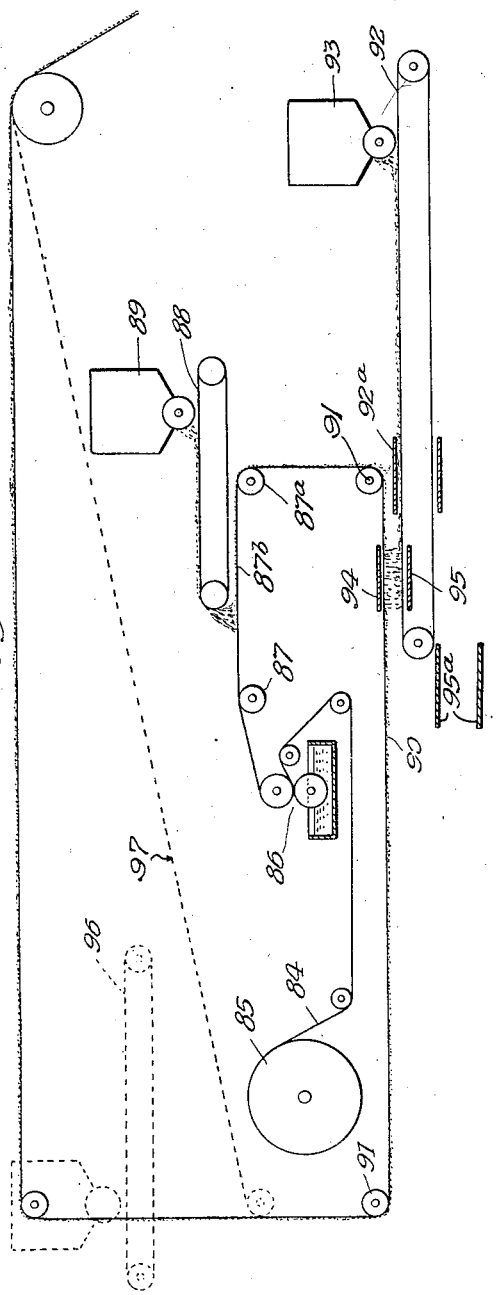
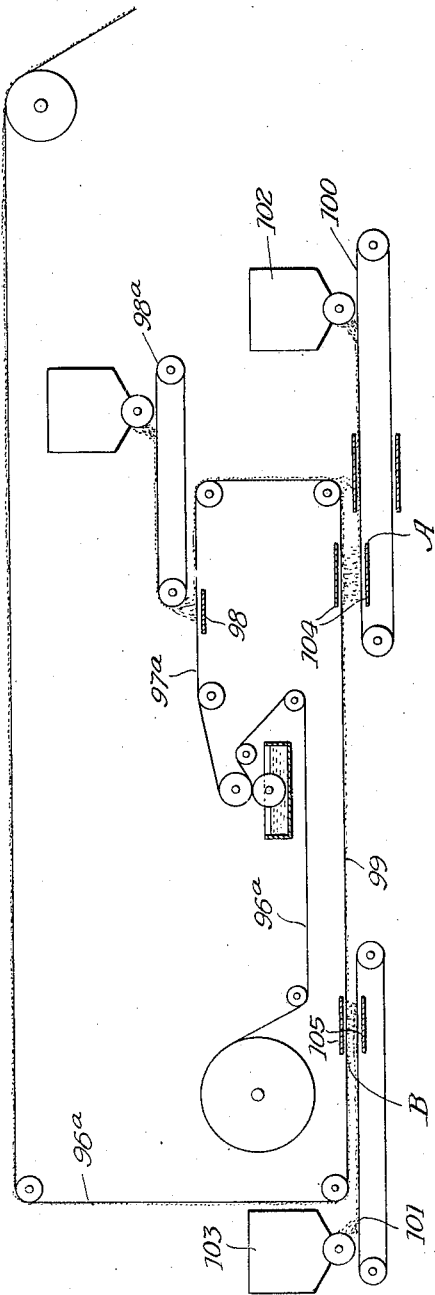
Inventor
Richard Paul Carlton

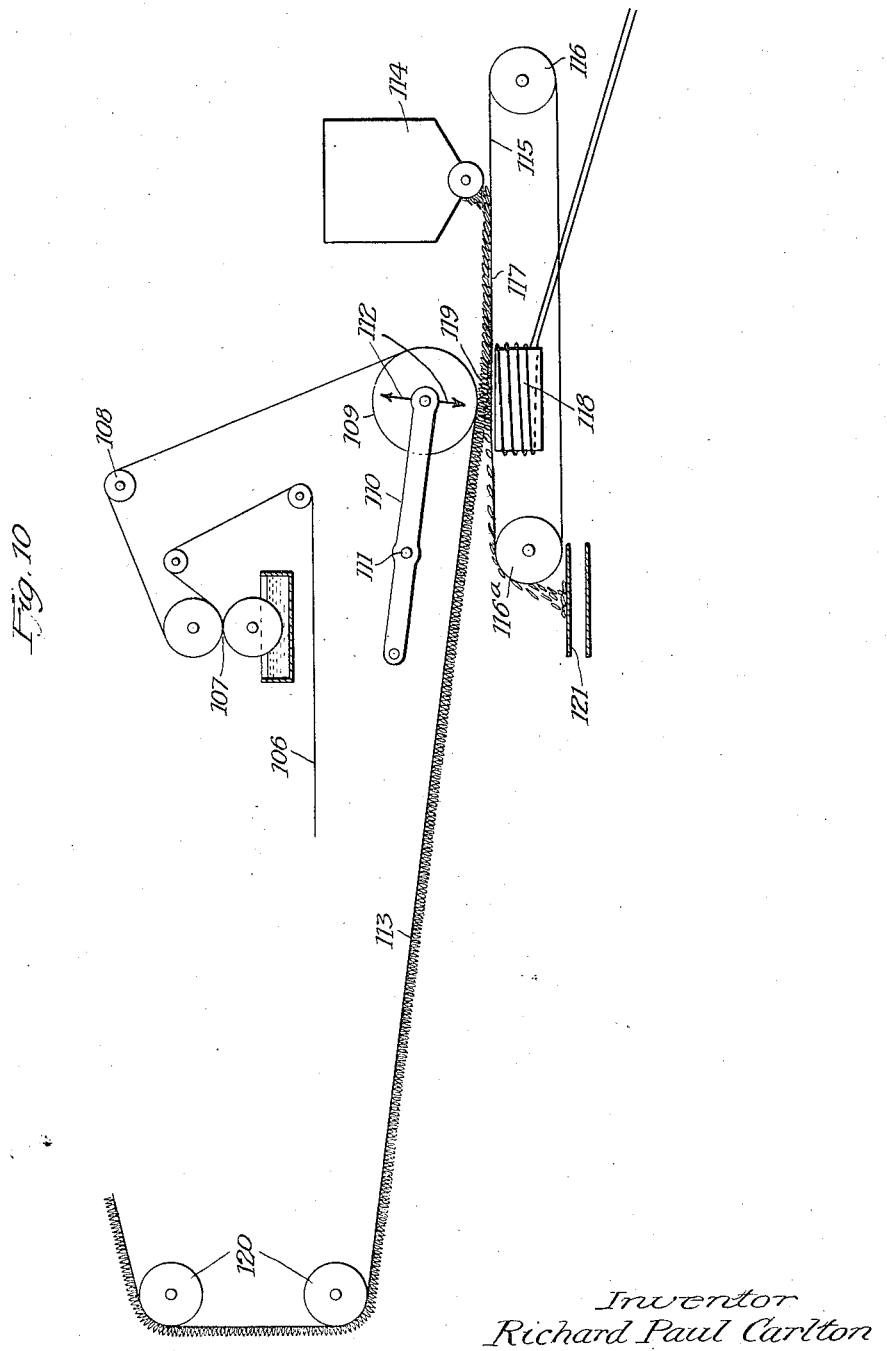

Patented May 4, 1943

2,318,570

UNITED STATES PATENT OFFICE 2,318,570

MANUFACTURE OF ABRASIVES

Richard Paul Carlton, St. Paul, Minn., assignor to Minnesota Mining & Manufacturing Company, St. Paul, Minn., a corporation of Delaware Application January 20, 1930, Serial No. 422,065

62 Claims. (Cl. 117—17)

This invention relates in general to coated articles and to the art of coating, and more particularly to an improved method of and apparatus for applying pulverulent coatings to suitably adhesively coated surfaces, and while the invention finds particular utility in the art of making flexible abrasives, and is, therefore, described and illustrated for this purpose, it finds a wide field of utility for analogous purposes.

It is well known that in the art of making sandpaper, emery paper or cloth and similar abrasive articles, a flexible, or in some cases, a rigid, backing of paper, cloth, wood or the like is employed, to which is applied a coating of an adhesive substance, such as animal or vegetable glue, or where a waterproof article is desired, the backing may be coated with any of the now well known waterproof adhesives of the Okie Patents 1,565,027, 1,565,028, of Dec. 8, 1925, or 1,581,657 of April 20, 1926, for this purpose, and while the coating is still wet or unset, a suitable abrasive material such as garnet, corundum, sand or the like is applied thereto. The grains of abrasive substances are usually applied by gravity upon the upper adhesive coated surface of the backing and they lie in the adhesive material in haphazard fashion due to the elongated nature of the abrasive particles, and in a large degree, the facets or cutting edges of the individual grains or grits often lie flat upon or are embedded in the adhesive coating in such a manner that in some instances their best cutting edges never come into contact with the work or at best are brought inefficiently into contact therewith. The invention here has as one of its objects to measurably increase the number of grits whose longer or greater dimensions are in a plane perpendicular to the surface of the backing, thereby to present more efficiently the cutting edges to the work, and increase the cutting ability and life of the abrasive article.

It will be understood that in ordinarily depositing mineral, that is, pulverulent abrasive material solely under the force of gravity onto a backing, it acquires a velocity due to the action of gravity. As the grits pass through the intervening air space, there will be caused some change in their positions enroute to the sheet or backing but ordinarily neither the velocity given to the grits or the effect of the air on them is sufficient to cause them to become alined so as to assume positions substantially perpendicular to the backing. It is, therefore, necessary that independent force be applied to the grits and I have found that by passing the grits through a static field of electric energy or of electro-magnetic energy or by mechanically imparting this force to the grits a much greater number of the individual particles will assume erect positions on the backing which will enhance its cutting ability. As will later appear, my invention, in its several forms, is capable of application for operation in conjunction with gravity methods of applying the grit, inasmuch as under certain conditions, and for some purposes, it is desirable to employ both gravity and one of the forms of my invention in conjunction in order to attain a desired form of abrasive article.

In carrying out this invention, I find it desirable to employ a conveyor for conducting the mineral at rest relative to the conveyor by relatively slow speed to a point adjacent to which the independent force is applied for projecting the particles of grit onto the backing. I find that by then applying this independent force, be it mechanical or electrostatic or electromagnetic, I am able to impart a high velocity to the particle so that any force of gravity acting on the particle, whether in the same direction, in a counter direction, or in a direction angularly to that at which the force is applied, will be relatively small compared to this force applied. It is possible with the present invention to apply the force directly counter to gravity, that is, by bringing the grits beneath the backing or by applying the force in some other direction as long as the force of gravity and the effect of air is reduced below a point which will interfere with the result desired, namely, the projection of the grits with their longitudinal dimensions ultimately perpendicular or substantially so with respect to the backing.

The principal objects and advantages of this invention reside in the provision of an improved abrasive coated article, such, for example, as sandpaper, emery cloth, or the like, wherein the abrasive grits or grains lie in position on the backing for increasing the cutting effect and durability of the abrasive article; the provision of an improved abrasive article wherein the abrasive grits are disposed so that their cutting facets are presented in position to more efficiently engage the work and thereby produce a sharper article; the provision of an improved abrasive article wherein the abrasive grains or grits are applied thereto with their longer or greater dimension substantially perpendicular to the plane of the backing; the provision of an improved abrasive article which may be flexible or rigid, as desired, and which may or may not be made waterproof, that is, suitable for employment in a water abrading operation.

This invention further includes as objects and advantages thereof, the provision of an improved method of an apparatus for manufacturing abrasive articles; the provision of an improved method of and apparatus for applying pulverulent material to one surface of a backing irrespective of the force of gravity, that is, against the normal tendency of the force of gravity; the provision of an improved method of and apparatus for propelling a pulverulent material, such as a grit or an abrasive grain, against an adhesive coated surface; the provision of an improved method of and apparatus for the purpose set forth and including electrically operated means for acting on an abrasive grain or pulverulent material and causing it to advance onto the adhesive coated backing irrespective of the force of gravity; the provision of an improved method of and apparatus for causing the particles of pulverulent material to impinge upon and assume a position in the adhesive coated surface substantially normal or perpendicular to the surface of the backing; the provision of an improved method of and apparatus for propelling a pulverulent material onto a moving sheet in a direction transversely to the plane of movement thereof and in a direction substantially counter to gravity; the provision of an improved method of and apparatus for making abrasive articles, such as sandpaper and the like, which includes the application of a grit to the under side of the backing; the provision of an improved apparatus which includes means for feeding and applying a pulverulent material counter to the force of gravity and simultaneously with movement of the backing; the provision of an improved means for moving a web of paper and applying an adhesive thereto and including means arranged below and for operating synchronously with for applying a pulverulent material to the under side of said moving backing; and the provision of an apparatus of the character described wherein improved electrostatic or electromagnetic means may be employed, acting on the abrasive material and causing it to move at an accelerated speed toward the sheet so as to cause it to impinge thereon in the adhesive coating and thereby present the cutting edges of the abrasive grits away from the surface of the backing and thus increase the cutting ability and life of the abrasive article.

I have also found my invention useful as a modifying step in the employment of the conventional gravity process for applying grit in the manufacture of sandpaper or other abrasive and, therefore, additional objects of this invention reside in the provision of an improved method of interposing an additional step which will apply abrasive grains either before or after the application of grits by gravity in the usual manner, it being understood that the step of applying grit irrespective of gravity by an electromagnetic or electrostatic means may be employed somewhere in the process of manufacture, the essential purpose being to increase the number of grits whose cutting facets are presented away from the backing and thereby to enhance the cutting ability of the finished article.

The apparatus of this invention includes a number of alternative forms for mechanically or electrically carrying out the steps of the process and to this end is provided an improved pneumatic means and improved vibrator structure for mechanically propelling the pulverulent material and improved electromagnetic structure for acting on the mineral and causing it to move in a cloud toward the adhesive coated surface of the moving web or backing.

The foregoing and such other objects and advantages as may appear or be pointed out as this description proceeds are attained in the structures illustrated in the accompanying drawings in which:

Figure 1 is a schematic view illustrating one form of apparatus for carrying out the process of this invention;

Figure 2 is a view similar to Figure 1 of an alternative form of the invention;

Figures 3, 4 and 5 are further alternative forms of the invention which include the electrical feature;

Figure 6 is a further alternative form of the apparatus of this invention of employing mechanical vibrating means;

Figure 7 is an enlarged schematic view illustrating a portion of an abrasive article made in accordance with this invention;

Figures 8 and 9 are additional alternative forms of apparatus for carrying out further steps of the process of this invention;

And Figure 10 is a further alternative form of apparatus for carrying out one of the methods of this invention.

The method of the present invention includes as steps thereof the feeding of a web or strip of paper or other fabric at a predetermined rate of speed, applying an adhesive substance to the under side of the sheet, or applying the adhesive coating to one side and then moving the sheet with the coated side out, and simultaneously with the movement of the coated sheet, causing a grit or abrasive material to be applied to this side. The sheet or web of paper may be moved so that the adhesive coated side is either presented downwardly or at any angle thereto. The movement of the abrasive grains onto the under side of the backing is done irrespective of the force of gravity and, in fact, directly counter to gravity, and preferably done by imparting relatively high velocity to the abrasive material, thus causing it to impinge upon the adhesive coating. In view of the fact that the abrasive grains are projected through an intervening space from a suitable carrier onto the adhesive coated side irrespective of or counter to the force of gravity, the grains, which are usually somewhat elongated, will assume a position in transit so that the longer dimension thereof will take a position normal to the surface of the backing, thus causing the grains to "stand" on the surface rather than lie flat in greater percentage than when they are deposited by gravity. It is to be understood that this movement of the grains and deposition of them on the coated surface may be carried out in a number of ways, either by vibration, by an air blast, or by electrostatic or electromagnetic means.

In the alternative forms of this invention later to be described, the method involved includes combining a gravity deposition of mineral on the adhesively coated moving backing with the step of applying the grits irrespective of gravity, this being particularly useful in some of the heavier grits wherein it may be found that the force susceptible of application by an electrostatic or an electromagnetic means is not sufficiently active on the available area of the individual grits to cause an entirely satisfactory result or to move enough of the grits onto the sheet to attain the desired end. In this invention it may be required to apply some of the grit by gravity and later apply some of the grit by one of the methods of this invention or vice versa, but, in any event, the number of grits in the entire finished article which stand erect on the backing will be measurably increased over the ordinary methods heretofore employed for depositing grit on a backing for forming an abrasive article.

This invention produces a very satisfactory piece of sandpaper in which the cutting ability is measurably increased and by the deposition of the grains of sand or grit irrespective of the force of gravity, it is possible to produce an orientation of the mineral as desired and to control the thickness of the abrasive coating much more readily than where gravity alone is relied upon or employed for depositing the grains on the sheet.

The apparatus of this invention may take any one of the forms shown in the drawings and in the form of the invention shown in Figure 1, air pressure is resorted to for producing the mineral cloud and for projecting the mineral onto the moving web.

Referring now more particularly to Figure 1, the flexible backing 5 of paper or cloth or other fabric is trained or fed over a series of rollers 6, 6, and over one of a pair of the squeeze rollers, indicated at 7, the other roller 8 of said pair being in contact with an adhesive material contained in a tray or tank 9 by which an adhesive coating is applied to one side of the moving web. After receiving the adhesive coating, the web 5 is trained over rollers 10 and 11 and is brought back over a roller 12 so that the adhesive coated surface of said web is presented downwardly. The web may then be trained over rollers 13, 13, and fed to a suction drum 14, whence it passes into festoons for drying.

The mineral is supplied from a hopper 16 and a conventional outlet 17 which feeds a layer 18 of mineral to a moving conveyor 19. This conveyor 19 is preferably porous and passes over the feeding rollers 20 and 21 and is adapted to move at a suitable rate of speed to supply a sufficient quantity of abrasive grain. In some cases, it has been found advantageous to move the conveyor at a speed substantially the same rate of speed as the web 15, although these speeds are, of course, variables. The rollers 20 and 21 are mounted in the ends of a suitable frame 22 and this frame may be raised and lowered so as to vary the distance between mineral conveyor 19 and the moving web 15. This frame 22 may be supported fixedly at one end, as indicated at 23, and the other end may be raised and lowered by a toggle arrangement 24 activated by a threaded rod 25. Below the conveyor 19 and at the movable end thereof, that is, adjacent to the web 15, there is provided a second conveyor 26 which serves to conduct away excess mineral which flows over the end of the conveyor 19 and which may be returned in any suitable manner to the mineral hopper.

Below the upper flight of the conveyor 19, there are provided two air troughs 27. These air troughs are provided with flat upper walls 28, having slots 29 therein, said slots extending across the width of conveyor 19 and the troughs themselves being connected to a suitable source of air under pressure.

These troughs form in effect elongated jets or nozzles and when so placed below the conveyor belt or frame 22, a small quantity of air is emitted at high velocity which passes through the porous belt or conveyor.

It will be understood that when a blast or blasts of air are delivered from the troughs 27, this blast of air passes through the porous conveyor 19 and blows the mineral from the conveyor against the under side of the flight 15 so that the mineral is caused to strike into the adhesive at a relatively high velocity and become impinged therein. Owing to the projecting of the mineral in this manner through the intervening air space, the individual particles of grit or abrasive material are caused to assume a position parallel to their trajectory, that is, with their longer dimension perpendicular to the surface of the flight 15. In view of the fact that most of the particles of mineral are somewhat elongated due to the manner of production of the same, they will naturally assume this position in movement from the conveyor 19 to the adhesive coated surface of the backing. As they arrive at the adhesive material, they impinge themselves thereon and will thus stand erect in the adhesive, thus forming a sharper contour for abrasive purposes. By varying the rate of speed of the moving backing relatively to the speed of the conveyor and by varying the distance between the conveyor and the backing and the velocity of the air stream, and by increasing or reducing the number of such jets and the quantity of adhesive applied, any reasonable desired thickness of grit layer may be produced during the process and without stopping the apparatus. It will be understood that the excess mineral carried by the conveyor may be dumped into the conveyor 26 and returned by any suitable means to the hopper 16.

Referring now to Figure 2, there is provided the same general arrangement of moving backing, having the flight 30 adhesively coated from the squeeze rollers 31.

Below the flight 30 there is provided a mineral feeding conveyor 19a, receiving pulverulent material from the hopper 16a.

The conveyor 19a is mounted for movement toward and away from the flight 30 similar to the conveyor 19 and, therefore, this structure has not been shown in Figure 2.

As the mineral flows from the hopper 16A it does not always assume a smooth or even distribution on the conveyor 19A, and, therefore, it may be desirable to provide a pair of charged electrodes 32, one arranged above and one below the conveyor 19A, for the purpose of spreading the mineral evenly on the conveyor belt. The conveyor 19A in this instance may be non-porous.

When charged electrodes are put in this position they act in principle the same as the charged electrodes used for coating the mineral on the backing. An electrical charge or difference of potential is set up between the electrodes 32. The voltage or difference in potential between those electrodes is maintained great enough to produce a strong static field, but not so great as to break down the insulation between the plates, which insulation may be the dielectric strength of the air or the dielectric strength of the air plus the dielectric strength of any insulating material which may be used to wrap the electrodes.

As the mineral on the conveyor enters the static field between the plates the mineral particles take on the charge of the lower plate, and are repelled to the upper plate where they lose their charge and take on the opposite charge of the upper plate. At this point they are repelled to the lower plate. Since new mineral is being conveyed by the conveyor into the field continuously the static fields soon become supersaturated with mineral particles, and an equilibrium is reached where as many particles are thrown out of the static field as are brought in by the conveyor. By having a down-turned end 32A of the upper electrode the mineral particles that are thrown out of the static field are deflected evenly on the conveyor belt so that a smooth coating of abrasive grit is first placed on the conveyor.

The use of a static field for getting a smooth coating of mineral on the conveyor belt is not necessary to the invention but is an additional means of obtaining evenly distributed abrasive coatings, and is also a means for avoiding the use of any excess mineral on the conveyor. When the mineral is evenly coated on the conveyor at the time it is being coated streaks, thin spots, etc., in the finished product are reduced.

At the same approximate point at which troughs 27 are provided in Figure 1 there are here provided electrically charged electrodes 33 and 34, the electrode 34 being located below the upper flight of the conveyor belt 19A and electrode 33 being disposed above the flight 30 of the backing. A sufficient difference of potential is maintained at electrodes 33 and 34 to produce a strong static field, similarly to that referred to above. This static field moves the mineral from the belt 19A to the underside, which is the adhesive coated surface of the flight 30.

As the mineral enters the static field between the electrodes 33 and 34 it becomes charged with the charge of the lower plate, and is here propelled to the upper plate 33.

It will be observed that in this method of coating the mineral is applied by a force other than gravity. In all other methods of coating sandpaper, known to me, the velocity of the particle is either in whole or part given to it by the force of gravity. In the case of this electrostatic coating the particles are oriented in the static field so that there is a tendency for the long dimension of the mineral to be perpendicular to the electrode plates, and also perpendicular to the web 30, which is being coated. The finished sandpaper product, therefore, contains a substantial percentage of the particles of mineral standing on end rather than laying flat, thereby increasing the cutting properties of the abrasive article.

Excess mineral is dumped onto the conveyor 35, whence it may be returned to the hopper 16a.

Referring now to the alternative form of the invention shown in Figure 3, there are provided the squeeze rollers 36 which apply adhesive to one surface of the moving paper web 37 and the adhesive coated surface thereof is presented downwardly in the flight 38.

In this instance there is provided a hopper 39, having a curved outlet spout 40 whose outlet 41 is presented below the moving web 38. The hopper may be provided with a bracket 42 whereby to receive a threaded member 43, said bracket engaging a guide post 44. In this manner, the hopper may be raised or lowered so as to vary the distance of the outlet 41 from the flight 38 of the backing. A suitable screen 45 may or may not be provided over the outlet so as to cause the distribution of the mineral contained in the hopper. In this instance, the mineral flows by gravity to the outlet 41, but does not pass from the outlet to the adhesive coated backing by gravity, but under the effect of the static charge established between the electrode 46 and the hopper or the screen 45 of said hopper.

The operation of the invention here is much like that of Figure 2, the screen 45 serving the purpose of distributing the mineral and at the same time preventing the large body of mineral in the hopper from forcing it against the coated surface of the backing.

Referring now to the form of the invention shown in Figure 4, there is provided the adhesive coating rollers 47, applying an adhesive coating to one surface of the moving web 48. This web 48 is trained over rollers 49 and 50 so that flight 51 thereof between said rollers is presented in a plane tangential to the surface of a conveyor drum 52 whose lineal velocity is sufficient to furnish the required amount of mineral. This drum is fed from a hopper 53 and forms one electrode of the electrostatic system. The other electrode is indicated at 54 and is disposed above the flight 51. As mineral issues from the gate 55 of the hopper, the drum rotating in the direction of the arrow A, the mineral is carried to a point adjacent to the flight 51 whereupon the electrostatic charge set up between the drum 52 and the electrode 54 will cause a projection of the mineral from the drum onto the coated surface of the flight 51.

Referring now to the alternative form of the invention shown in Figure 5, there is employed here electromagnetic means or a permanent magnet means for moving the grits toward the adhesively coated web. The adhesively coated web is shown at 72 and is fed from a roll 73 over an adhesive coating roller 74. The horizontal flight of the web 72 passes beneath magnet 75 which may be either an electromagnet upon which a variable voltage may be imposed or a permanent magnet. Immediately below the magnet 75 and the flight 72 of the web, there is provided a source of supply for the mineral, that is, the abrasive material, indicated at 76. This source includes an outlet 77, and the distance between the outlet 77 and the moving web 72 may be varied as desired, or the intensity of the electromagnet, where one is employed, may be varied for changing the thickness of the abrasive coating. The web passes over an idler 78 whence it is fed to festoons not shown.

Referring now to the form of the invention shown in Figure 6, the moving web 56 is trained over a series of rollers similar to the arrangement shown in Figures 1 and 2 so that a horizontal flight 57 of the paper backing is provided, having an adhesive coating on the under side thereof. Squeeze rollers 58 engage the paper backing for applying an adhesive thereto.

In this form of the invention, a mechanical vibrating means is provided which serves to propel the mineral, that is, the grit, from the grit feeding conveyor 59, which latter receives mineral from the hopper 60, having a gate 61. The conveyor 59 is trained over rollers 62 and 63 mounted in a suitable frame 64, which latter may be mounted for adjustment toward and away from the flight 57 similarly to the conveyor 19 of Figure 1. The conveyor 59 extends below and is separated from the flight 57 of the paper web and travels at substantially the same speed as the paper web.

The conveyor 59 passes between sets of pinch rollers, one above and one below the upper flight of the conveyor 59, as indicated by 65 and 66, and also beneath a pinch roller 67 which bears on the roller 62. The pinch rollers 65 and 66 tend to distribute the mineral evenly over the surface of the conveyor and are so spaced from the rollers 62 and 67 that the portion of the belt 59 between the rollers 65 and 66, and 62 and 67 is permitted to lie slack whereas the remaining part of the conveyor is substantially taut. This arrangement tends to limit the vibration of the conveyor belt to the zone of application of the mineral to the paper backing, as indicated at 68.

Beneath the portion 68 of the belt 59, there is provided a revolving batter 69 operating on a shaft carried in suitable bearings in the frame 64 and provided with a plurality of radial arms 70 which upon rotation rigidly strike the under side of the portion 68 of the belt, thus throwing or projecting the mineral content thereof against the under side of the adhesive coated paper backing, much in the manner in which the air stream blows the mineral or grit against the paper backing as shown in Figure 1. The batter 69 may be driven in any desired manner from a separate source of power or may be connected suitably with the rollers driving the belt 59, but geared to operate at a greater rate of speed. The rollers 65 and 66 and the roller 67 are separately driven from the belt 59 so as to produce the tautness in the belt, except the flight of the belt indicated at 68.

In Figure 7, there is illustrated an article made in accordance with the present invention. The backing is shown at 80 to which an adhesive coating 81 has been applied, and the grits, greatly enlarged, are indicated at 82 and it is noted that they stand on end in the adhesive coating, thus causing their sharper edges to project beyond the upper or outer surface of the coating, thereby enhancing the cutting ability and increasing the life of the abrasive article. While the article shown in Figure 7 is purely schematic, it will be understood that the mineral actually does take a position substantially normal to the backing and, while all of the grits may not take this position, a large number of the same do and the cutting qualities of the abrasive article are thus greatly increased. Furthermore, by so disposing the grits, it permits of the application of an additional sizing coat or coats to the back and to the front or cutting face of the abrasive material without completely burying the grits and as a thicker coat of adhesive may thus be employed on the cutting face of the abrasive material, the engagement of the adhesive material with the abrasive material is greatly enhanced, thus further tending to increase the life of the abrasive article. Such a sizing coat is indicated at 83.

As previously pointed out where the electrostatic or electromagnetic methods are resorted to in some of the coarser grades of abrasive devices made, it may be found that the electrostatic or magnetic field into which the particles are conducted may not exert on each individual particle sufficient force to cause proper orientation of the particles for the reason that the static effect is substantially proportional to the area of the particle and the coarser the particle, the smaller the area of effect per weight. Therefore, as larger grits or sizes of particles are employed, increased force is required to move the particle and for some purposes, insufficient increase in force results because of the reduced area per weight. Therefore, in such cases a form of the invention, as shown in Figure 8, may be resorted to wherein the mineral is applied to the adhesively coated backing in part by gravity and in part by electrostatic or electromagnetic means.

In view of the fact that the electrostatic and electromagnetic means may for some purposes be alternatively employed, I have illustrated in Figure 8 merely the electrostatic elements though it will be understood that the electromagnetic means of Figure 5 may be employed in the same manner.

Referring in detail to Figure 8, I have illustrated a web of paper 84 coming off a roll 85 and passing through an adhesive coating device illustrated in general at 86. The web 84 is thence trained over rollers 87, 87a, so that it has a substantially horizontal flight 87b, which receives grits in the desired amount from an ordinary conveyor 88, said conveyor receiving grits from the hopper 89. The web of paper thence is carried downwardly to a horizontal flight 90 by the provision of rollers 91, 91 and adjacent one end of this flight, I provide the conveyor 92 receiving additional grits from the hopper 93, which may be adjustably mounted similar to the conveyors hereinabove described, said conveyor 92 passing beneath the flight 90 of the paper web. As the web passes over the rollers 87a and 91, a quantity of the mineral deposited from the conveyor 88 onto the web will drop off, and, for conveying away this excess mineral, I provide a transversely running conveyor 92a arranged between the flight 90 and the conveyor 92. Beneath the upper flight of the conveyor 92 and above the flight 90 of the web 84, I provide static electrodes 94 and 95, or may provide an electromagnet similar to that shown in Figure 5 which will cause grit coming from the hopper 93 to be applied counter to the force of gravity onto the under surface of the flight 90. A conveyor 95a may be employed for carrying off the excess mineral from the conveyor 92.

In the operation of this form of the invention, it will be understood that a desired proportion of mineral applied by gravity to that applied by force other than gravity may be determined by actual operation so that the desired quantity of the abrasive grits is properly applied to the paper web.

It may be necessary in some of the very coarse grains to additionally apply grit to the moving web and this may be done by providing an additional conveyor similar to that indicated at 92 and additional electrodes, or may be accomplished by additionally applying by gravity grits at the point indicated at 96, this arrangement being shown in dotted lines and the grits being applied to an upper flight 97 of the paper web just before it passes on to the festoons.

Figure 9 illustrates the alternative forms suggested in connection with Figure 8, that is, wherein electrostatic or electromagnetic means, or any other means counter to gravity, is employed for applying the grits and in Figure 9 the paper web is indicated at 96a having a horizontal flight 97a disposed below a conveyor 98a. In this instance, the grits are deposited from the conveyor 98a by gravity and the orientation of the grits is assisted by a plate electrode 98. The paper web may then be carried in position so as to provide a horizontal flight 99 and an electrostatic or electromagnetic or other grit applying means for applying grit counter to gravity may be employed at one or more points as indicated at A and B, wherein the conveyors 100 and 101 convey grit from suitable hoppers 102 and 103, and electrodes 104, 104, and 105, 105 serve to apply the grit.

Referring now in detail to Figure 10, there is further illustrated there an apparatus for applying the grit to the adhesively coated backing by an electromagnetic means. In this form of the invention a moving web is provided indicated at 106, this web being a flexible strip of paper which is suitably adhesively coated by a mechanism indicated generally at 107.

The moving web thus adhesively coated is carried over a roller 108, thence over a roller 109, said roller 109 being mounted on a shaft carried in a bearing arm or arms 110 pivotally mounted at 111, whereby the roller 109 may be raised and lowered in the substantially vertical plane of the arrows 112, thus permitting the lower flight 113 of the paper web to be elevated or depressed, as the case may be.

Mineral is deposited from a hopper 114 on to a conveyor 115 trained over rollers 116 and 116a, the upper flight 117 of said conveyor passing beneath the roller 109 and the moving web, and conveying mineral, that is, the grit, to a point adjacent to the roller 109.

Preferably immediately below the axis of the roller 109 and below the upper flight 117 of the conveyor 115 I provide an electromagnet 118 which is so mounted that its magnetic flux passes through the conveyor and causes the mineral particles to stand erect, as indicated at 119, as they move along with the upper flight of the conveyor. While the mineral particles are thus standing erect they come into contact with the adhesively coated side of the paper backing and are thus picked up by it and conveyed away, the backing being trained over rollers 120 and carried to the festoons similarly to the other forms of the invention. It will be observed that the angularity of the lower stretch 113 of the paper web is such that lies upwardly to the conveyor 115. In this way the particles of grit adhering to the paper are not knocked down by other particles remaining on the conveyor, it being understood that the grid is fed somewhat in excess of the required amount so that an adequate amount will be deposited on the adhesively coated side of the backing. The excess mineral drops off the conveyor 117 and is carried to a collecting means by a conveyor 121.

It will be understood that by varying the amount of mineral fed from the hopper, the strength of the electromagnet, that is, the strength of the flow current transferred, and the position of adjustment of the roller 109 the assembly may all be properly correlated for obtaining the desired grade of finished article.

It may be desirable that a certain amount of pressure be exerted on the erect particles of mineral so as to cause them to impinge upon the adhesively coated side of the paper and thus, by manipulation of the arms 110, an adjustment of the pressure of the roller 109 may be attained.

It will be understood that while the electrostatic and electromagnetic means for coating counter to gravity are illustrated in Figures 8 and 9, the mechanical means hereinabove described may be conveniently employed in these locations without departing from the spirit of the invention. However, the reason the electromagnetic and electrostatic elements are particularly shown here is that the difficulty of counter coating successfully with the coarser grains is more likely to arise with these elements than with the vibrator or air blast heretofore described.

I wish to point out that where the expressions "electromagnetic" and "electrostatic" are employed in the specification, I will refer to the employment as well of a permanent magnet or some other form of static charge or magnetic charge which will perform the function.

Having thus described my invention and illustrated its use, what I claim as new and desire to secure by Letters Patent is:

1. The method of coating a continuously moving backing with a pulverulent material which includes as one of its steps the propulsion of the pulverulent material from a preliminarily distributed layer thereof onto one surface of the backing in a direction resisting the normal force of gravity and arranging the pulverulent material on end.

2. The method of making an abrasive article having a backing and a grit layer which includes as steps thereof coating a backing with adhesive, and forcibly propelling a pulverulent abrasive substance to said adhesive coated surface from a preliminarily formed layer and against the normal force of gravity for causing the particles of abrasive to assume a position in the adhesive with the major dimensions thereof substantially normal to the plane of said backing.

3. The method of coating a backing with a pulverulent material which includes as steps thereof, feeding the backing at a substantially uniform rate of speed, supplying the pulverulent material to the zone of application in a substantially thinly distributed layer on a conveyor spaced from said backing, and propelling the pulverulent material from the conveyor through the intervening space onto one surface of the backing in a direction counter to the force of gravity.

4. The method of coating a backing with a pulverulent material which includes as steps thereof, feeding the backing at a substantially uniform rate of speed, in a substantially horizontal plane, feeding a pulverulent material below said backing in a substantially horizontal plane, and propelling the pulverulent material upwardly to cause the same to impinge upon one surface of said backing.

5. In an apparatus of the character described, in combination, means for supporting a backing, means for applying an adhesive thereto, means below and spaced from said backing for supplying a pulverulent material in a layer arranged substantially in parallelism to said backing, and means for applying said material to said backing including an air jet for propelling said material against said backing through the intervening space.

6. In an apparatus of the character described, in combination, means for supporting a backing, means for applying an adhesive thereto, means below and spaced from said backing for supplying a pulverulent electrically susceptible material, and means for creating an electrical field including electrically charged elements below said supplying means and above said backing for propelling said material onto the backing under the influence of said field.

7. In an apparatus of the character described, in combination, means for supporting a backing, means for applying an adhesive thereto, means below and spaced from said backing for supplying a pulverulent electrically susceptible material, means for distributing said material during supplying of the same, and means for creating an electrical field including electrically charged elements below said supplying means and above said backing for propelling said material onto the backing under the influence of said field.

8. In an apparatus of the character described, in combination, means for supporting a backing, means for applying an adhesive thereto, means below and spaced from said backing for supplying a pulverulent electrically susceptible material, electrostatic means for distributing said material during supplying of the same, and means including electrically charged elements below said supplying means and above said backing for propelling said material onto the backing.

9. In an apparatus of the character described, means for applying an adhesive to a backing and for supporting the adhesive coated surface facing downwardly in a substantially horizontal plane, a hopper for pulverulent electrically susceptible material having a curved portion terminating in an outlet below and spaced from the adhesive coated portion of said backing, and means acting electrically on said pulverulent material for lifting it from said outlet and propelling it against said adhesive coated portion.

10. In an apparatus of the character described, in combination, means for supporting a backing, means for applying an adhesive to the under side thereof, a drum for feeding an abrasive material arranged to have its surface below and spaced from said backing, which is in a plane substantially tangential thereto, and a charged electrode above said backing for creating an electrical field and for moving material from the drum to said backing and influenced by said field to cause a predetermined positioning of the particles of abrasive material in relation to the backing.

11. In an apparatus of the character described, in combination, means for supporting a backing, means for applying an adhesive coating thereto, means for feeding said backing with the coated side down, a conveyor for abrasive material below and spaced from said backing, means for distributing abrasive material to said conveyor, and means for vibrating said conveyor for propelling the abrasive material distributed thereon therefrom to said coated backing.

12. In an apparatus of the character described, in combination, means for supporting a backing, means for applying an adhesive coating thereto, means for feeding said backing with the coated side down, a conveyor for abrasive material below and spaced from said backing, means for distributing abrasive material to said conveyor, and means for applying an impact to said conveyor for propelling abrasive material therefrom to said coated backing.

13. In an apparatus of the character described, in combination, means for supporting a backing, means for applying an adhesive coating thereto, means for feeding said backing with the coated side down, a conveyor for abrasive material below and spaced from said backing, means for distributing abrasive material to said conveyor, means for rendering taut a portion of said conveyor and for slackening a portion thereof beneath said backing, and a batter for imparting vibrations to said slackened portion for propelling the abrasive material therefrom onto said backing.

14. The method of coating a backing with a pulverulent material which includes as steps thereof moving the backing at a substantially uniform rate of speed in a substantially uniform plane, said backing having an adhesive coating presented downwardly, feeding the pulverulent material below said backing in spaced relation thereto, propelling the pulverulent material upwardly to cause the same to impinge upon said coated surface, and varying the distance between the backing and the pulverulent material, as fed, for varying the thickness of the coating of the latter.

15. In an apparatus of the character described, in combination, means for moving a backing of sheet material at a uniform rate of speed, means for applying an adhesive coating to one side of said backing, means arranged below and in spaced relationship to said backing for conveying an abrasive material, means for moving said abrasive material onto said adhesive coated backing through the intervening space counter to the force of gravity, and means for varying the distance between said backing and said means for conveying abrasive material.

16. The method of manufacturing abrasives which includes as steps thereof, employing an adhesively coated backing, conveying and uniformly distributing in a substantially thin layer a quantity of pulverulent abrasive material to a point adjacent to but spaced from the coated backing, and projecting the abrasive material across the intervening space onto said backing the projecting force being controlled within limits affecting the axial position of said material.

17. In the manufacture of abrasives employing abrasives susceptible to the influence of an electrical field to axially arrange themselves in respect of said field, the improved method which consists in providing a carrier having a surface coated with an adhesive, depositing said finely divided abrasive material upon said surface by a force in a direction counter to the force of gravity, and dispersing the particles by the action of an electrical field as they are being deposited upon the surface.

18. The method of manufacturing granular coated webs which comprises applying a layer of adhesive to a side of a continuously moving web, moving said web in such a manner that the adhesive coated side is positioned downward, supplying irregularly shaped granular particles to a feed belt positioned beneath said web and moving in a direction substantially parallel therewith, and projecting the granular particles from said belt onto the adhesive coated web.

19. The method of manufacturing granular coated webs which comprises supporting an adhesive coated web with an adhesive side downward, supplying irregularly shaped granular particles to a mesh conveyor belt positioned beneath said web and projecting said particles from said belt onto said adhesive coated web by means of air blown through said mesh conveyor belt.

20. The method of manufacturing granular coated webs which comprises supporting an adhesive coated web with an adhesive side downward, supplying granular particles to a conveyor belt positioned beneath said web and moving said belt over and in contact with rotating beaters.

21. The method of manufacturing flexible webs coated with upstanding abrasive grain which comprises projecting the grain upwardly against an inverted adhesive coated web so that the grain is oriented in its flight and strikes and adheres to the inverted web in a position with its major axes at a substantial angle to the surface of said web.

22. The method of manufacturing flexible webs coated with upstanding abrasive granules which comprises selecting abrasive granules a substantial proportion of which are elongated in character, supporting an adhesive coated web with the adhesive side downward, projecting such grain upwardly against said adhesive surface in such a manner that a substantial proportion of the elongated particles are oriented in flight with their major axes at a substantial angle to the plane of said web and adhere thereto in such oriented position.

23. The method of making sand paper and other abrasives consisting in supporting the abrasive substantially parallel with the backing sheet and blowing the abrasive particles against the adhesive surface of the backing sheet to project thereinto at substantially right angles, while the backing sheet is in position to permit the surplus abrasive particles to fall away from the same.

24. A machine for making sand paper including, an endless belt carrier, a hopper and spreader for abrasive particles adapted to spread abrasive particles onto said endless belt as it travels past said hopper, and means for shooting the abrasive particles off of said belt against an adhesive surface on the paper adapted to make the abrading surface of the sand paper.

25. A machine for forming abrasive material including a porous flexible carrier belt, means for applying abrasive particles on said belt, means for supporting an adhesive coated backing sheet adjacent a portion of said carrier belt, a nozzle on the side of the carrier belt opposite the side supporting the abrasive particles, for directing a blast of air through said porous belt to blow the abrasive particles against the adhesive coating of the backing sheet.

26. An apparatus of the class described comprising a horizontally moving conveyor for abrasive particles, a horizontally moving adhesive coated web moving parallel to said conveyor above the same and having its adhesive surface exposed with relation to particles on said conveyor, and an electrical field disposed in the path of movement of said conveyor and web for propelling particles from the conveyor upwardly to said adhesive surface.

27. An apparatus of the class described comprising a horizontally moving conveyor for abrasive particles, a horizontally moving adhesive coated web moving parallel to said conveyor above the same and having its adhesive surface exposed with relation to particles on said conveyor, and an electrical field disposed in the path of movement of said conveyor and web for propelling particles from the web upwardly to said adhesive surface, said conveyor and web extending in proximity to each other beyond the point of electrical deposition whereby any surplus particles tending to remain on the web will be returned to said conveyor under the influence of gravity immediately after the web has passed from the electrical field.

28. Apparatus for the manufacture of granular coated webs comprising electrodes arranged one above another having opposing faces of substantial area, means for applying a potential difference to the upper and lower electrodes, means for supporting an adhesive coated web between said electrodes and with an adhesive coated surface downward, and means for supplying granular particles between said web and the lower of said electrodes, said apparatus being adapted to electrostatically project granular material against the downwardly facing adhesive surface of the web.

29. Apparatus for the manufacture of granular coated webs comprising electrodes arranged one above another having opposing faces of substantial area, means for applying a potential difference to the upper and lower electrodes, means for passing an adhesive coated web between said electrodes and with an adhesive coated surface downward, and means for supplying granular particles between said web and the lower of said electrodes, said apparatus being adapted to electrostatically project granular material against the downwardly facing adhesive surface of the web.

30. Apparatus for the manufacture of granular coated webs comprising electrodes arranged one above the other, means for applying a high electrical potential difference to the upper and lower electrodes, means for passing an adhesive coated web between said electrodes with the adhesive coated surface downward, a feed belt passing over the lower electrode for carrying the granular material into the electrostatic field between the electrodes and means for supplying granular material to the feed belt, said apparatus being adapted to electrostatically project the granular material from the feed belt upwardly against the downwardly facing adhesive coated surface of the web.

31. Apparatus for the manufacture of granular coated webs comprising electrodes arranged one above the other, means for applying a high electrical potential difference to the upper and lower electrodes, means for passing an adhesive coated web between said electrodes with the adhesive coated surface downward, a feed belt passing over the lower electrode for carrying the granular material into the electrostatic field between the electrodes, means for supplying granular material to the feed belt and additional means for controlling the quantity of granular material supplied to said feed belt, said apparatus being adapted to electrostatically project the granular material from the feed belt upwardly against the downwardly facing adhesive surface of the web.

32. Apparatus for the manufacture of granular coated webs comprising electrodes arranged one above the other, means for applying a high potential difference between said upper and lower electrodes, means for passing an adhesively coated web between said electrodes with the adhesively coated surface downward, a feed belt passing over the lower of said electrodes for carrying the granular particles into the electrostatic field between the electrodes, means for distributing said particles as a layer over said feed belt, said apparatus being adapted to electrostatically project the granular material upwardly as a shower with the particles spaced apart and free from each other.

33. Apparatus for the manufacture of granular coated webs comprising electrodes arranged one above the other, means for applying a high electrical potential difference between said upper and lower electrodes, means for passing an adhesively coated web between said electrodes with the adhesive coated surface downward, a feed belt for carrying the granular particles into the electrostatic field between the web and the lower of said electrodes, said apparatus being adapted to electrostatically project the granular particles upwardly through a substantially quiescent atmosphere against the downwardly facing adhesive coated surface of the web.

34. In apparatus for making a new sandpaper or emery cloth, the combination comprising a hopper for abrasive particles, an opening in said hopper to feed a thin layer of the abrasive particles out of said hopper, an endless belt adapted to pick up the thin layer of abrasive particles, means beneath said belt adapted to move the abrasive particles in relation to said belt, means for carrying the flexible backing sheet of the sandpaper or the like with a coat of adhesive over the surface thereof exposed at a point adjacent said means beneath said belt and said endless belt and in adjustable relationship to each other, whereby the abrasive particles carried by said belt are moved by said means beneath said belt to the surface of the adhesive on the flexible sheet automatically to coat the surface of the sheet with the abrasive particles standing out individually one from the other.

35. In apparatus for making a new sandpaper, the combination comprising a hopper for abrasive particles, an opening from said hopper to feed a thin layer of abrasive particles out of said hopper, an endless belt adapted to pick up the thin layer of abrasive particles, a blower beneath said endless belt adapted to blow the abrasive particles off said belt, means for adjustably disposing said endless belt and a flexible backing sheet of the sandpaper or the like with a coat of adhesive over the surface thereof in relation to each other adjacent said blower whereby the abrasive particles carried by said belt are blown by said blower into the surface of the adhesive on the flexible sheet automatically to coat the surface of the sheet with the abrasive particles standing out individually one from the other.

36. Apparatus for making sandpaper including an endless belt carrier, a hopper and spreader for abrasive particles adapted to spread abrasive particles onto said endless belt carrier as it travels past said hopper and means for moving the abrasive particles off said belt against an adhesive surface of a sheet in position to permit the surplus abrasive particles to fall away from the same and including means for receiving said excess particles and conducting the same away from the means for moving the same against the adhesive surface.

37. In a device for making abrasive material including, a carrier, a hopper for distributing abrasive particles onto said carrier, means for operating said carrier, means for shooting the abrasive off of said carrier, and means for extending the material having an adhesive surface at a point adjacent said means for shooting the abrasive in adjustable relationship to each other to cause the abrasive particles to adhere to the material and form the abrasive material.

38. An apparatus of the class described comprising a horizontally moving conveyor for abrasive particles, means for moving an adhesive coated web horizontally and parallel to said conveyor above the same so as to expose its adhesive surface with relation to particles on said conveyor, and means disposed in the path of movement of said conveyor and web for propelling particles from the conveyor upwardly to said adhesive surface.

39. An apparatus of the class described comprising a horizontally moving conveyor for abrasive particles, means for moving an adhesive coated web horizontally and parallel to said conveyor above the same so as to expose its adhesive surface with relation to particles on said conveyor, and means disposed in the path of movement of said conveyor and web for propelling particles from the conveyor upwardly to said adhesive surface, said conveyor and web extending in proximity to each other beyond the point of said means whereby any surplus particles tending to remain on the web will be returned to said conveyor under the influence of gravity immediately after the web has passed from the said means.

40. An apparatus for making sand paper including, an endless belt carrier, a hopper and spreader for abrasive particles adapted to spread abrasive particles onto said endless belt as it travels past said hopper, and electrical means for shooting the abrasive particles off of said belt against an adhesive surface on the paper adapted to make the abrading surface of the said paper.

41. The method of manufacturing granular coated webs which comprises applying a layer of adhesive to a side of a continuously moving web, moving said web in such a manner that the adhesive coated side is positioned downward, supplying irregularly shaped granular particles to a feed belt positioned beneath said web and moving in a direction substantially parallel therewith, passing said web through an electrical field including at least one electrode, controlling the spacing between said web and said feed belt, and projecting the granular particles from said belt onto the adhesive coated web during passage of the same through the electrical field.

42. The method of manufacturing granular coated webs which comprises applying a layer of adhesive to a side of a continuously moving web, moving said web in such a manner that the adhesive coated side is positioned downward, supplying irregularly shaped granular particles to a feed belt positioned beneath said web and moving in a direction substantially parallel therewith, passing said web and belt through an electrical field and projecting the granular particles from said belt onto the adhesive coated web while passing through said field.

43. The method of manufacturing granular coated webs which comprises applying a layer of adhesive to a side of a continuously moving web, moving said web in such a manner that the adhesive coated side is positioned downward, supplying irregularly shaped granular particles to a feed belt positioned beneath said web and moving in a direction substantially parallel therewith, passing said web and belt through an electrical field having an electrode disposed above said web, and projecting the granular particles by electrical attraction from said belt onto the adhesive coated web while passing through said field.

44. The method of manufacturing granular coated webs which comprises applying a layer of adhesive to a side of a continuously moving web, moving said web in such a manner that the adhesive coated side is positioned downward, supplying irregularly shaped granular particles to a feed belt positioned beneath said web and moving in a direction substantially parallel therewith, passing said web and belt through an electrical field having an electrode disposed above said web and another below said belt, and projecting the granular particles by electrical attraction from said belt onto the adhesive coated web while passing through said field.

45. A coating machine comprising a receptacle for abrasive particles to be applied as a coating to a carrier including means to guide said carrier, means to discharge the particles from the receptacle to fall by gravity and to spread the same preliminarily, means in the path of the particles falling from the receptacle to feed them in a distributed condition toward said carrier and means to vibrate said last mentioned means, whereby the particles are further distributed and applied to said carrier.

46. Apparatus for adhesively affixing elongated or attenuated materials upon a surface comprising opposed electrode means insulated from each other, one of said electrodes being foraminous and serving to distribute said materials, means for establishing an electric field between said electrodes, means for feeding between said electrodes a web, the surface of which is to be coated with said materials and means for introducing elongated or attenuated materials to be directed into the electric field between said electrodes and cooperating with the openings in said foraminous electrode to feed the materials into the field in a distributed condition.

47. Apparatus in accordance with claim 46 in which there is included means for conducting an adhesively coated web between said electrodes, with the adhesive coated surface downwardly faced towards the foraminous electrode.

48. In a deposition apparatus, in combination, means for supporting a backing, means for applying an adhesive thereto and facing the adhesively coated backing downward, means below and spaced from said backing for supplying comminuted material susceptible of carrying an electrical charge for causing movement thereof, and means including electrically charged elements below and above said backing for propelling said material upward onto the backing to adhesively unite the same to said backing.

49. In a deposition apparatus in accordance with claim 48, the combination wherein said means for supporting the backing includes means for facing the adhesively coated surface thereof downwardly during the time said electrically charged elements are effectively operating upon the material which is propelled upwardly to the said adhesively coated surface of said backing.

50. Apparatus for the manufacture of granular coated webs comprising electrodes arranged one above the other, means for applying a potential difference to the upper and lower electrodes, means for supporting an adhesive coated web between said electrodes with an adhesive coated surface thereof downward, means for supplying granular particles between said web and the lower of said electrodes, said apparatus being adapted to electrically project granular material against the downwardly facing adhesive surface of the web, said electrodes being plates, which achieve orientation of a substantial number of the particles substantially normal to the plates and the web which is being coated between them.

51. Apparatus for the manufacture of granular coated webs comprising electrodes arranged one above the other, means for applying a potential difference to the upper and lower electrodes, means for supporting an adhesive coated web between said electrodes with an adhesive coated surface thereof downward, means for supplying granular particles between said web and the lower of said electrodes, said apparatus being adapted to electrically project granular material against the downwardly facing adhesive surface of the web, one of said electrodes being a plate.

52. An apparatus for forming bonded granular articles wherein elongated granular materials are adhesively combined upon a web for said materials comprising electrodes arranged to be spaced apart in relation to the web, means for applying a potential difference to said electrodes and means for supplying an adhesive to form a bond for said materials to said web and means for introducing elongated granular materials for said web between said electrodes, said electrodes being spaced apart and insulated from each other by the dielectric strength of the air and including the dielectric strength of insulating material applied to at least one of said electrodes which, by reason of the potential difference imposed upon said electrodes, maintains an electrostatic field adapted to electrostatically orient the elongated granular particles so that their longest dimensions lie in a predetermined direction in respect of said web.

53. Apparatus for the manufacture of granular coated webs comprising an electrode arranged to be positioned above the web to be coated and spaced apart from an electrode arranged to be positioned below the web, means for applying a potential difference to said electrodes, means for supporting an adhesive coated web between said electrodes and with the adhesively coated surface faced downwardly, and means for supplying granular particles between said web and the lower of said electrodes, said electrodes being spaced apart and insulated from each other by the dielectric strength of the air and the dielectric strength of insulating material applied to at least one of said electrodes, the potential difference imposed upon said electrodes and the dielectric between said electrodes maintaining an electrostatic field between said electrodes, said apparatus being adapted to electrostatically project granular particles against the downwardly facing adhesive surface of the web.

54. Apparatus for the manufacture of granular coated webs comprising a plate electrode arranged to be positioned above the web to be coated and spaced apart from a plate electrode arranged to be positioned below the web, means for applying a potential difference to said plates, means for supporting an adhesively coated web between said plates and with the adhesively coated surface faced downwardly, means for supplying granular particles between said web and the lower of said paltes, said plates being spaced apart and lying in the direction of travel of the web, and insulated from each other, the arrangement of the plates in relation to the potential difference imposed on said plates and the dielectric between the plates serving to maintain a strong electrostatic field, said apparatus being adapted electrostatically to orient and project granular particles against the downwardly facing adhesive surface of the web.

55. In an apparatus for coating particles of material upon a backing the combination comprising a carrier for particles of material deposited thereon, means propelling said particles upwardly against the force of gravity from the surface of the carrier upon which said particles have been deposited to a surface of said backing coated with an adhesive, means acting upon the particles deposited upon the carrier for distributing said particles of material, subsequent to deposition thereof on said carrier surface, to spread the same evenly on said carrier surface prior to the propulsion thereof to said adhesive coated surface of said backing.

56. Apparatus in accordance with claim 55 wherein the means for distributing the particles comprises electrically energized elements creating an electrostatic field which disperses the particles in relation to each other.

57. In an apparatus for coating particles of material upon a backing the combination comprising a carrier for particles deposited thereon, means propelling said particles upwardly against the force of gravity from the surface of the carrier upon which said particles have been deposited to a surface of said backing coated with the adhesive, means acting upon the particles deposited upon the carrier for distributing said particles of material subsequent to the deposition thereof on said carrier surface to spread the same on said surface prior to the propulsion thereof to said adhesive coated surface of said backing, said distributing means comprising mechanical means acting upon the particles to form a substantially uniform layer.

58. In an apparatus of the character described, means for supporting a backing, means for applying an adhesive thereto and means below and moving synchronously with said backing for feeding a pulverulent material, and means for applying said material to said backing.

59. In an apparatus of the character described, means for supporting a backing, means for applying an adhesive thereto, and means below said backing for feeding a pulverulent material, and means acting electrically upon said pulverulent material for applying it to said adhesive coated backing.

60. In an apparatus of the character described, means for supporting a backing, means for applying an adhesive thereto, and means below said backing for feeding a pulverulent material, and electrostatic means for applying said material to said backing.

61. The method of applying elongated particles of material to an adhesive coated surface of a backing which includes the steps of depositing said particles upon a moving surface, passing said moving surface through an electrostatic field generated by two vertically opposed electrodes where the particles are charged and successively repelled from the surface and deflected back by the upper electrode to the surface whereby said particles are distributed thereon to spread the same and form a uniform layer with the particles thereof evenly distributed, bringing said adhesive coated surface of said backing into spaced relationship to said moving surface and applying an upwardly directed force to the uniform layer to propel said particles against the force of gravity and to transfer the particles from said moving surface and to embed them endwise in the adhesive coating on said backing surface.

62. The method of coating a continuously moving adhesively coated backing with elongated particles of matter comprising forming the particles into a layer, conducting the layer through an electrostatic field generated by two vertically opposed electrodes, with the lines of force substantially normal to the layer where the particles are charged and successively repelled from the layer and deflected by the upper electrode evenly back to the layer to disperse and to distribute the particles in the layer, positioning the adhesively coated backing in a second electrostatic field which applies an upwardly directed force to the dispersed layer to propel the particles in a direction resisting the normal force of gravity onto the adhesive coated surface of the backing and arranging them on end by conducting the dispersed layer into the second field adjacent the adhesive coated side of the backing.

RICHARD PAUL CARLTON.